E. B. & A. B. WILDER.
PROCESS OF DIE CUTTING WOOD AND SIMILAR MATERIALS.
APPLICATION FILED NOV. 9, 1912.
1,082,985.
Patented Dec. 30, 1913.
2 SHEETS—SHEET 1.
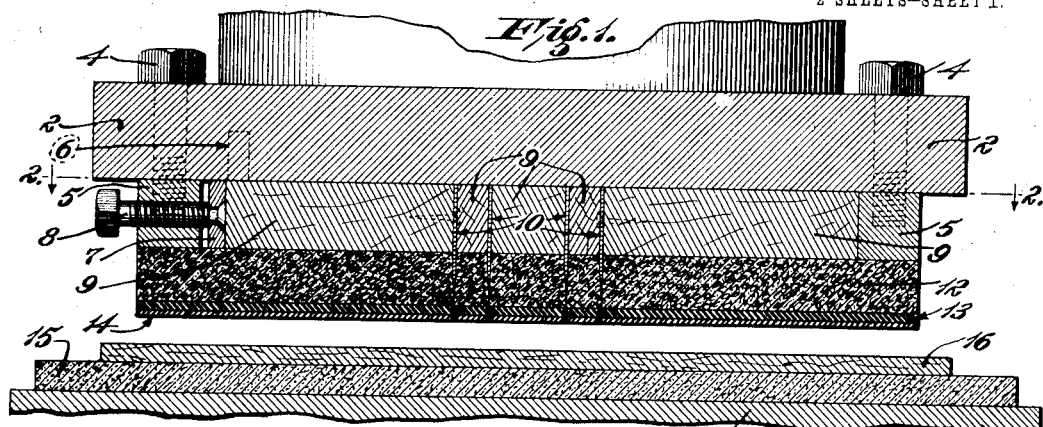
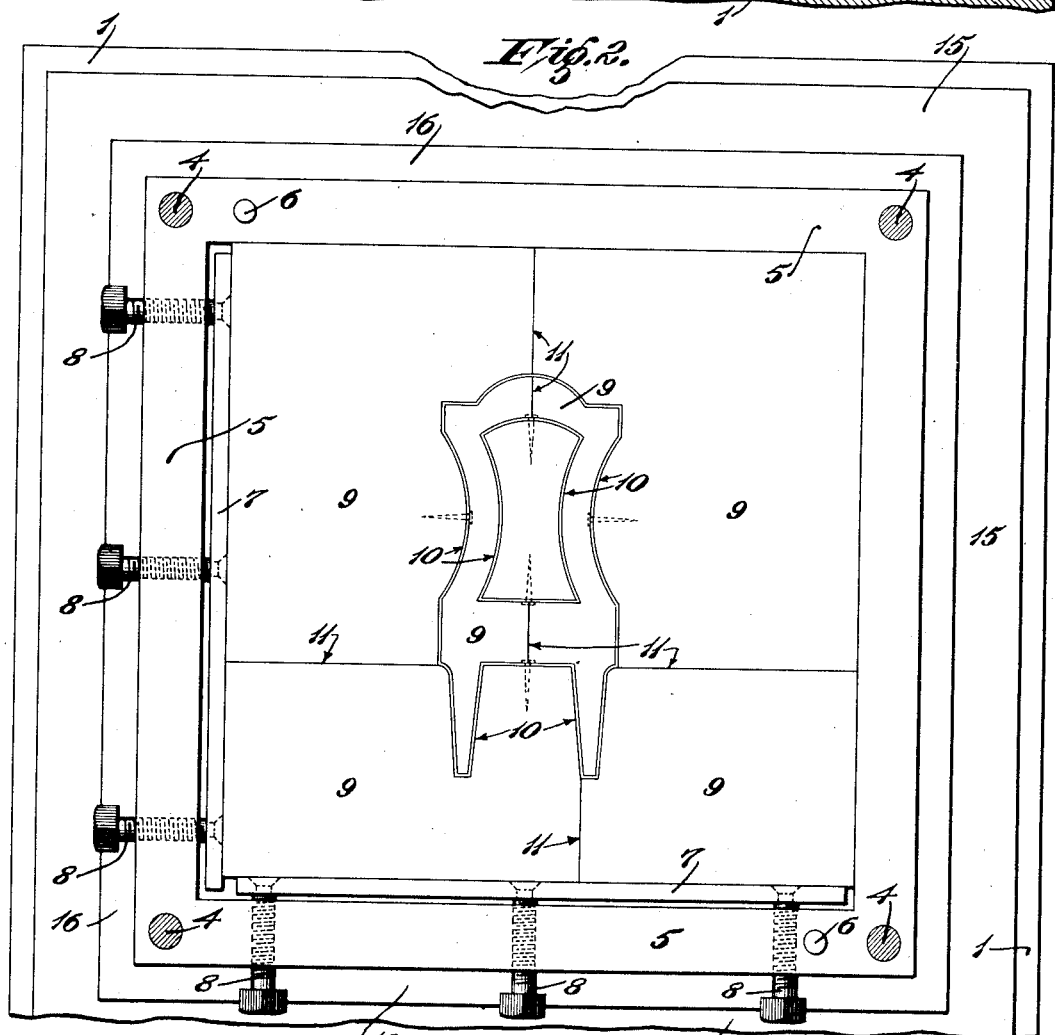

E. B. & A. B. WILDER.
PROCESS OF DIE CUTTING WOOD AND SIMILAR MATERIALS.
APPLICATION FILED NOV. 9, 1912.
1,082,985.
Patented Dec. 30, 1913.
2 SHEETS—SHEET 2.
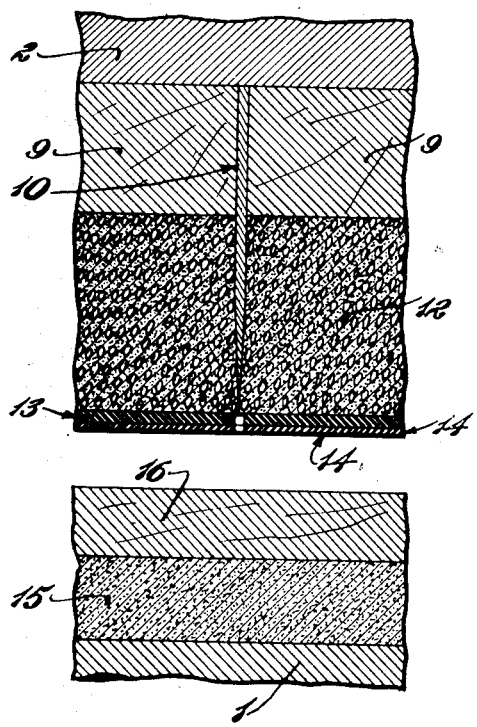
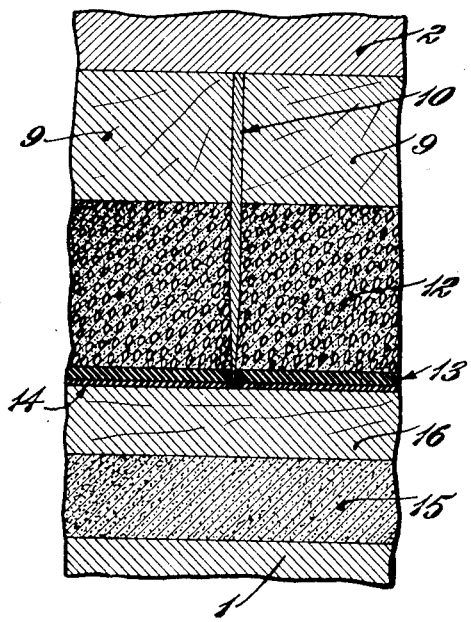
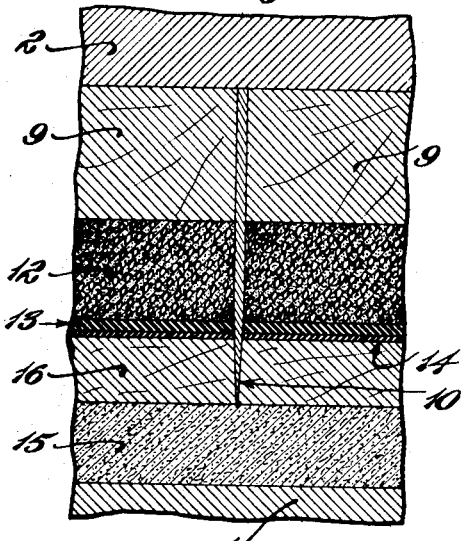
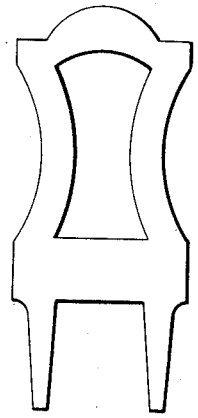
Witnesses:
Edgar T. Farmer
G. A. Pennington
Inventors:
Edward B. Wilder and
Allen B. Wilder,
By Cann their Attys.

UNITED STATES PATENT OFFICE.

EDWARD B. WILDER AND ALLEN B. WILDER, OF ST. LOUIS, MISSOURI.

PROCESS OF DIE-CUTTING WOOD AND SIMILAR MATERIALS.

1,082,985.  Specification of Letters Patent.  Patented Dec. 30, 1913.

Application filed November 9, 1912. Serial No. 730,339.

*To all whom it may concern:*

Be it known that we, EDWARD B. WILDER and ALLEN B. WILDER, citizens of the United States, and residents of the city of St. Louis and State of Missouri, have invented a new and useful Process of Die-Cutting Wood and Similar Materials, of which the following is a specification.

This invention relates to processes of die-cutting sheets of wood and other materials, such as cardboard, pressed fiber, leather, rubber and the like, and is particularly adapted to cutting intricate patterns, and for inlay work.

It has for its principal objects to avoid injuring the surface of the material; to prevent splitting and splintering or crushing the material; to enable thick material to be cut with a thin blade; to shear the material into sections having clean cut rectangular edges; to obviate the necessity for preliminarily treating the material; and to attain certain other advantages which will hereinafter more fully appear.

Attempts to cut out wooden pieces having intricate outlines by ordinary die-cutting or punching methods have resulted in splitting and splintering the wood, and in some cases the surface of the wood has been injured. Other disadvantages and difficulties have arisen in such methods of die-cutting rubber, cardboard, pressed fiber, leather and the like. For instance, the edges of the cut pieces are not clean cut and true, and if a thin cutting blade is used it buckles and twists and also sticks to the material. Heretofore it has not been possible to cut composite patterns by means of dies except when the material is very thin.

The present invention consists principally in clamping the material to be cut by means of a pressure distributed in such a way as to insure and maintain proper alinement of the cutting knives or blades with respect thereto throughout the cutting operation.

It also consists in supporting the cutting blades by means of resilient pads on both sides thereof, whereby thin blades may be used for cutting thick material, said pads likewise being adapted to firmly clamp the material before the knife edges reach the cutting position.

In the accompanying drawing which forms part of this specification and wherein like symbols refer to like parts wherever they occur,—Figure 1 is a vertical section of a die mechanism suitable for carrying out the process, together with portions of certain parts of an ordinary press on which said die mechanism is mounted; Fig. 2 is a horizontal section on the line 2—2 of Fig. 1; Fig. 3 is a fragmentary view, on an enlarged scale, showing the parts in normal positions; Fig. 4 is a similar view showing the positions of the parts as the cutting blade is about to enter the work; Fig. 5 is a similar view after the cutting blade has passed all the way through the work; and Fig. 6 is a plan view of the cut out piece.

The process is conveniently performed by means of suitable dies in an ordinary press arranged as is shown in the drawings. Above the bed 1, the press has a movable head or plate 2 which is mounted on a vertical reciprocatory plunger 3. The plunger may be operated by any suitable toggle or other obvious power mechanism (not shown) according to the type of press that is used.

Secured to the under side of the head 2 of the press, as by screws 4, is a chase or rectangular frame 5 adapted to receive and hold the die to be presently described. This frame or holder is provided with dowel pins 6 which enter holes provided therefor in the head 2 so as to position said holder properly to receive the securing screws 4. The holder is also provided with follower bars 7 which have the inner ends of screws 8 swiveled thereto so as to clamp the die in place.

The die comprises a block or backing 9 which may be of metal or wood, as desired. If the die block is made of wood, a continuous cut is made therein with a band saw or scroll saw, said cut being of the same contour as the article to be formed. A thin cutting blade or knife 10 is fitted around the cut and the cut out piece is placed back in the opening within the blade. The blade may be tacked at intervals to the block, but this is not absolutely necessary as the blade may be made to bear against the under side of the head 2; the tacks being used merely to hold the blade from pulling out of the block 9 while the cut material is being stripped therefrom and also to hold the blade in place on the block when the latter is detached from the chase or holder 5.

The cutting blade or knife 10 may be made to conform to any desirable contour, as for example, the outline of a toy figure or image; or, as shown in the drawing, a back section for a toy chair. The arrangement shown in the drawing illustrates that a plurality of cutting blades may be arranged the one within the other, whereby the outer one is adapted to cut the outline or outer margin of the article and the other is adapted to cut openings in said article simultaneously.

The die block 9 is preferably made out of a single piece, the cut out portion thereof being replaced and mounted in its original position; or it may be divided into sections, as indicated by the lines of division 11 shown in the drawing, and held together by the clamping elements 7, 8.

Glued or otherwise secured to the under side of the die block 9 is a body or layer of resilient material, preferably sponge rubber or the like having a multiplicity of air or gas-filled pockets or cells so that it may be compressed without any appreciable lateral elongation or spreading when confined between walls. The surface area of the layer of material 12 may be such that its marginal portions underlie the chase or holder 5. In some cases, the under side of the die block is flush with the under side of the holder and in other cases it may not be so thick. However, the required surface area is governed principally by the surface area of the object to be cut out and also by the surface area of the material from which the object is cut, as will hereinafter more fully appear. The normal thickness of the layer of sponge rubber 12 depends principally upon the thickness of the material from which the object is to be cut. In practice it has been found expedient to have the body of sponge rubber of a thickness approximately three times that of a wooden board or sheet to be cut. For example, if the wood is one quarter of an inch thick, the sponge rubber should be about three-quarters of an inch thick. When the piece to be cut out has a surface area of more than five inches by five inches, the size of the piece is of but little consequence as far as the pressure per square inch is concerned. Therefore, for the relative thickness above stated, the sponge rubber may be compressed to one-fourth of its normal thickness. However, this pressure is excessive and is liable to injure the surface of the wood. Hence, it is not desirable to compress to within less than five-sixteenths of its normal thickness, and a safe maximum compression has been found to be to not less than three-eighths, while the average compression is one-half. To keep the wood from splitting it is desirable that there should ordinarily be a pressure of about sixteen pounds per square inch before the blade enters the wood. Therefore, if the wood to be cut is one-fourth of an inch thick and the sponge rubber is three-fourths of an inch thick, the rubber should be compressed about one-eighth of an inch before the blade begins to enter the wood. Therefore, in such cases, the edge of the blade should be normally one-eighth of an inch inward from the bottom face of the layer of sponge rubber. Of course, this is only typical with reference to sponge rubber, and where other similar substances are substituted the proportions may be varied; and the variations in the relative proportions will depend somewhat on the material to be cut.

To preserve the surface finish of the material to be cut and to build up the pressure on intricate cuttings where there is a tendency for the material to bind on the blade when stripping, it is preferable, in some cases, to provide a layer 13 of some relatively hard and inelastic substance, such as hard rubber, celluloid or pressed fiber, on the under side of the layer 12 of the sponge rubber. In other cases, a thin layer 14 of sheet rubber may be placed on said layer 13. The hard layer 13 serves as a binder for the under side of the layer 12; and the outer layer 14 acts as a cushion upon the surface of and also serves to frictionally hold the material being cut and thereby prevents shifting while the cutting blade is entering the material. When these two layers 13, 14, are provided, the edge of the blade 10 will be located approximately one-eighth of an inch inward from the bottom face of the outer layer, so that the sponge rubber layer 12 will have the initial compression of one-eighth of an inch, as above set forth. The sponge rubber not only serves to exert a pressure or clamping action on the material being cut, but also supports the blade laterally. Hence a relatively deep or wide and very thin blade may be used. The sponge rubber further acts as a stripper to remove the material from the blade after the cut has been made.

It is desirable to create an equal support on both sides of the cutting blade so as to prevent it from buckling and twisting. This is accomplished satisfactorily when the blade is located so that there is a substantially equal mass of the sponge rubber on either side thereof; but should the blade be located near to the margin of the body of sponge rubber or close to the side of the chase or holder, it will then be necessary to have the body of sponge rubber extend under the chase, in which case the chase ought to be deeper than the thickness of the die-block and the rubber cut away or rabbeted so that normally the entire under face of the body of rubber is in the same plane. In this way, the reduced thickness of rubber under the chase is compressed to a greater density than the balance. Hence, the lateral support for the blade is equal on both sides. The quantity of the rubber removed is determined by the degree of compression to be given the main body of rubber, and, of course, the relative thickness of the die-block and depth of the chase or holder must correspond accordingly. So, too, in an intricate cutting where portions of the cut out piece are relatively narrow and necessitate locating two or more blades or rebent sides of a continuous blade close together, or where the different portions of the cut out object are of various proportions, a portion of the body of sponge rubber between the blades may be removed and a filler block or blocks of corresponding proportions placed on the under side of the die-block, so as to secure an equalized lateral support for the blades and also to insure the stripping of the cut out piece from between the blades.

A platen or backing 15 of hard rubber, celluloid, pressed fiber, or an equivalent substance that will not dull the cutting edge of the blade, is mounted on the bed 1 of the press to support the board or sheet of material 16 which is to be cut; and in some cases, the outline of the object to be cut out may be cut or grooved in the platen or backing 15 so as to make a clearance for the cutting edge of the blade.

Certain woods spread laterally under compression more than others and some have a certain resiliency which makes them have a greater binding effect on the cutting blade as it backs out of the work. However, this binding does not depend entirely upon the friction of the wood, but it is to be noted that the greater the cutting friction the more the wood binds. Therefore, it is obvious that well seasoned close grained wood is best adapted for treatment by the present process.

To get the best results the blade should have a long tapering cutting edge, and it should not pass into the wood beyond the termination of its bevel, for the reason that the wood wedges so tight that the blade would stick. So, too, clean cut edges are obtained by moving the blade relatively fast through the work; and in some cases the cutting edge of the blade may be scalloped, serrated, or otherwise irregularly shaped, as desirable. By using the thin blades which the construction and arrangement of the device permit, pieces may be cut out for inlay work so as to fit with exact nicety. That is, a piece may be cut out of a board or sheet of material and a like piece cut out of another board or sheet with the same die, and the respective pieces will fit the opening in either of the boards or sheets.

While the die shown and described herein comprises a form block on which the cutting blade is secured, together with the compression body of resilient substance, in some cases the blade may be mounted on a separate carrier above the form block and reciprocated through the form block and body of resilient substance thereon. In such a case, suitable means may be provided to move the form block first so as to compress the resilient substance on the work, and then actuate the cutting blade. Also, in such a case, the blade may work through a snug fitting sheath or tube which is embedded in the body of resilient substance and slidable through the form block so as to permit the latter to move independent thereof. In this way, the sheath supports the blade and at the same time keeps it out of contact with the body of resilient substance and thereby prevents the blade from shaving off pieces of the substance as it reciprocates therethrough.

While it is preferable to use what is known commercially as "sponge rubber" as a means for clamping the material to be cut, it is noted that other resilient compressible materials, particularly such as are more or less cellular, may be used to advantage in lieu thereof, in carrying out the process of the present invention.

In practising the present process, the sheet of material to be cut is placed on a suitable backing or support and, while the material is thus supported, the cutting device is forced against it. In the forward movement of the cutting device, the sponge rubber first comes in contact with the material and, by the time the cutting edge of the knife reaches the material, the pressure on the material transmitted through the sponge rubber firmly clamps the material in place. If the material is easily compressible it will be compressed to the point where it may be cut with true edges before the knife touches it. The further forward movement of the cutting device causes the knife to enter and sever the material, while the pressure on the material prevents the splitting or spreading of such material. During this action, the sponge rubber presses against both sides of the knife or blade and gives lateral support thereto, thereby insuring the proper position and alinement of the blade. As the cutting device moves backward, the blade is withdrawn from the material while the latter is still under the pressure of the sponge rubber. The severed material is thereby stripped from the blade; and as the sponge rubber holds the material to the backing or support, the material is prevented from splitting while the cutting blade is being withdrawn therefrom.

What we claim is:

1. The process of die-cutting thick sheets which consists in subjecting the material to be cut to initial pressure throughout its engaged area and forcing the die blades into the material while laterally supporting said blades throughout their length.

2. In die-cutting thick sheets with knife blades, supporting the blades laterally to maintain them in normal alinement by applying pressure to both sides thereof throughout their length by the compression of a resilient pneumatic medium.

3. The process of die-cutting thick sheets in composite patterns which consists in forcing thin cutting blades arranged in pattern form through the sheet while applying pneumatic pressure to the sides of said cutting blades.

4. In die-cutting compressible sheet material by means of knife blades arranged in pattern form, compressing the material and maintaining said blades in normal alinement by supporting them laterally through the application of a resilient compressible medium applied to said material throughout its entire extent.

5. The process of die-cutting thin wood and the like, which consists in mounting the cutting blade snugly between sections of a resilient compressible material with its cutting edge sunk within the face of such material, and then forcing said resilient compressible material and blade against the wood to be cut, whereby the pressure due to change in volume of said compressible material compacts the wood and supports the blade laterally while the blade cuts the wood.

Signed at St. Louis, Missouri, this 1st day of November, 1912.

EDWARD B. WILDER.
ALLEN B. WILDER.

Witnesses:
G. A. PENNINGTON,
PAULINE ANEBERG.

Copies of this patent may be obtained for five cents each, by addressing the "Commissioner of Patents, Washington, D. C."